United States Patent
Liang et al.

(10) Patent No.: US 12,405,712 B2
(45) Date of Patent: *Sep. 2, 2025

(54) METHOD AND APPARATUS FOR USER GUIDANCE, DEVICE AND STORAGE MEDIUM

(71) Applicant: BEIJING ZITIAO NETWORK TECHNOLOGY CO., LTD., Beijing (CN)

(72) Inventors: Chenqi Liang, Beijing (CN); Xiaoshuang Bai, Beijing (CN); Yuxi Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 104 days.

This patent is subject to a terminal disclaimer.

(21) Appl. No.: 18/219,539

(22) Filed: Jul. 7, 2023

(65) Prior Publication Data

US 2023/0350553 A1   Nov. 2, 2023

Related U.S. Application Data

(63) Continuation of application No. 17/885,538, filed on Aug. 11, 2022, now Pat. No. 11,733,849, which is a
(Continued)

(30) Foreign Application Priority Data

Sep. 25, 2020  (CN) .......................... 202011027615.5

(51) Int. Cl.
*G06F 3/04845*  (2022.01)
*G06F 3/0481*   (2022.01)
(Continued)

(52) U.S. Cl.
CPC ........ *G06F 3/04845* (2013.01); *G06F 3/0481* (2013.01); *G06F 3/165* (2013.01);
(Continued)

(58) Field of Classification Search
None
See application file for complete search history.

(56) References Cited

U.S. PATENT DOCUMENTS 9,002,175 B1 * 4/2015 Raj .......................... H04N 5/76
386/241
10,616,155 B2 * 4/2020 Choi ..................... H04L 51/216
(Continued)

FOREIGN PATENT DOCUMENTS

CN   103399690 A   11/2013
CN   104679383 A   6/2015
(Continued)

OTHER PUBLICATIONS

International Patent Application No. PCT/CN2021/119400; Int'l Search Report; dated Dec. 16, 2021; 6 pages.
(Continued)

*Primary Examiner* — Tuyetlien T Tran
(74) *Attorney, Agent, or Firm* — BakerHostetler

(57) ABSTRACT

The present disclosure describes techniques for user guidance of a creation mode. The techniques comprise acquiring creation guidance information for a user, the creation guidance information configured to guide the user to use a creation function in an application, and the creation function configured to create first multimedia content; presenting, in a current page of the application, second multimedia content created in a creation mode and a visual representation corresponding to the creation guidance information, the visual representation comprising a creation user interface element, the creation user interface element configured to
(Continued)

enable the application to enter the creation mode for initiating a creation of the first multimedia content; and presenting a creation page associated with the creation function based on interaction associated with the visual representation.

20 Claims, 8 Drawing Sheets

Related U.S. Application Data continuation of application No. PCT/CN2021/119400, filed on Sep. 18, 2021.

(51) Int. Cl.
<table><tr><td>G06F 3/16</td><td>(2006.01)</td></tr><tr><td>G06F 9/451</td><td>(2018.01)</td></tr><tr><td>G06T 11/00</td><td>(2006.01)</td></tr><tr><td>G06F 3/0482</td><td>(2013.01)</td></tr><tr><td>G06F 3/0484</td><td>(2022.01)</td></tr><tr><td>G06F 3/04842</td><td>(2022.01)</td></tr><tr><td>G06F 3/04883</td><td>(2022.01)</td></tr><tr><td>H04M 1/72448</td><td>(2021.01)</td></tr></table>

(52) U.S. Cl.
CPC .............. *G06F 9/453* (2018.02); *G06T 11/00* (2013.01); *G06F 3/0482* (2013.01); *G06F 3/0484* (2013.01); *G06F 3/04842* (2013.01); *G06F 3/04883* (2013.01); *G06F 9/451* (2018.02); *H04M 1/72448* (2021.01)

(56) References Cited

U.S. PATENT DOCUMENTS

| | | | |
|---|---|---|---|
| 10,645,294 B1* | 5/2020 | Manzari | H04N 23/74 |
| 11,212,449 B1* | 12/2021 | Manzari | H04N 23/633 |
| 2005/0103187 A1 | 5/2005 | Bodlaender | |
| 2006/0120624 A1* | 6/2006 | Jojic | G06F 16/739 |
| | | | 382/284 |
| 2008/0016468 A1 | 1/2008 | Chambers et al. | |
| 2008/0045336 A1* | 2/2008 | Stelzer | G07F 17/3227 |
| | | | 463/30 |
| 2012/0162242 A1* | 6/2012 | Amano | G06F 3/04886 |
| | | | 345/592 |
| 2013/0227415 A1* | 8/2013 | Gregg | G06F 16/783 |
| | | | 715/723 |
| 2014/0226052 A1* | 8/2014 | Kang | H04N 23/632 |
| | | | 348/333.02 |
| 2014/0281911 A1* | 9/2014 | Kim | G06F 16/957 |
| | | | 715/234 |
| 2014/0300779 A1* | 10/2014 | Yeo | H04N 23/71 |
| | | | 348/234 |
| 2016/0105619 A1* | 4/2016 | Lee | G06F 3/0482 |
| | | | 348/333.01 |
| 2016/0196584 A1* | 7/2016 | Franklin | G06Q 30/0269 |
| | | | 715/745 |
| 2017/0013179 A1* | 1/2017 | Kang | H04N 23/631 |
| 2017/0220233 A1* | 8/2017 | Yang | G06F 3/04845 |
| 2018/0046341 A1* | 2/2018 | Lee | G06F 3/04883 |
| 2018/0183995 A1* | 6/2018 | Barnett | G06V 10/70 |
| 2018/0198990 A1* | 7/2018 | Greenberger | H04N 5/2621 |
| 2018/0349008 A1* | 12/2018 | Manzari | H04N 23/64 |
| 2019/0058940 A1* | 2/2019 | Zheng | H04R 1/225 |
| 2019/0079797 A1* | 3/2019 | Hori | G06Q 10/0633 |
| 2019/0295439 A1* | 9/2019 | Odell | G09B 5/02 |
| 2019/0342507 A1* | 11/2019 | Dye | G06T 13/40 |
| 2020/0045245 A1* | 2/2020 | Van Os | H04N 23/611 |
| 2020/0053288 A1* | 2/2020 | Kim | H04N 23/667 |
| 2020/0311474 A1* | 10/2020 | Toyoda | G06F 3/04817 |
| 2020/0336804 A1* | 10/2020 | Cui | H04N 21/4781 |
| 2020/0358963 A1* | 11/2020 | Manzari | H04N 23/633 |
| 2020/0366963 A1* | 11/2020 | Liao | H04N 21/4312 |
| 2022/0075982 A1* | 3/2022 | Fukuda | H04N 1/3876 |
| 2023/0124461 A1* | 4/2023 | Lin | H04N 21/4312 |
| | | | 715/708 |

FOREIGN PATENT DOCUMENTS

| | | |
|---|---|---|
| CN | 106897081 A | 6/2017 |
| CN | 109828800 A | 5/2019 |
| CN | 109982130 A | 7/2019 |
| CN | 111625165 A | 9/2020 |
| CN | 112114925 A | 12/2020 |
| JP | 2018-005893 A | 1/2018 |
| JP | 2018-092402 A | 6/2018 |
| JP | 2020-017870 A | 1/2020 |
| KR | 2004-0077784 A | 9/2004 |
| KR | 2020-0017072 A | 2/2020 |
| WO | WO 2013/126854 A1 | 8/2013 |

OTHER PUBLICATIONS

European Patent Application No. 21871460.8; Extended Search Report; dated Jul. 31, 2023; 9 pages.
Written Opinion for International Application No. PCT/CN2021/119400, mailed Dec. 16, 2021, 9 Pages.

\* cited by examiner

METHOD AND APPARATUS FOR USER GUIDANCE, DEVICE AND STORAGE MEDIUM

CROSS-REFERENCE TO RELATED APPLICATION(S)

The present application is a continuation of U.S. patent application Ser. No. 17/885,538, filed on Aug. 11, 2022, which is a bypass continuation application of International Patent Application PCT/CN2021/119400, filed on Sep. 18, 2021, which claims priority to Chinese Patent Application 202011027615.5, filed in the Chinese Patent Office on Sep. 25, 2020, and entitled "Method and Apparatus for User Guidance, Device and Storage Medium", all of which are herein incorporated by reference in their entireties.

FIELD

Example embodiments of the present disclosure generally relate to the field of computers, and in particular, to a method and apparatus for user guidance, a device and a computer-readable storage medium.

BACKGROUND

At present, more and more applications are designed to provide various services for users. For example, the users can browse, comment and forward various types of content in content sharing applications, including multimedia content such as videos, images, image sets and sound. In addition, the content sharing applications also allow the users to create and publish multimedia content, such as photos or videos. For application providers, it is expected that more and more users can participate in content creation and publishing, which can not only provide more and richer multimedia content on platforms, but can also improve the user viscosity of the applications.

SUMMARY

According to an example embodiment of the present disclosure, a solution for user guidance is provided, so as to guide and promote users to use a creation function of an application.

In a first aspect of the present disclosure, a method for user guidance is provided. The method includes: acquiring creation guidance information for a user, the creation guidance information being used for guiding the user to use a creation function in an application, and the creation function being used for creating multimedia content. The method further includes: in a case where the application is in an active state, presenting, in an active page of the application, a visual representation corresponding to the creation guidance information. The method further includes: switching, on the basis of interaction associated with the visual representation, from the active page to a creation page associated with the creation function.

In a second aspect of the present disclosure, an apparatus for user guidance is provided. The apparatus includes an information acquisition module, configured to acquire creation guidance information for a user, the creation guidance information being used for guiding the user to use a creation function in an application, and the creation function being used for creating multimedia content. The apparatus further includes an information presentation module configured to, in a case where the application is in an active state, present, in an active page of the application, a visual representation corresponding to the creation guidance information. The apparatus further includes a page switching module, configured to switch, on the basis of interaction associated with the visual representation, from the active page to a creation page associated with the creation function.

In a third aspect of the present disclosure, an electronic device is provided. The device includes at least one processing unit; and at least one memory, coupled to the at least one processing unit and storing instructions executed by the at least one processing unit. The instructions, when executed by the at least one processing unit, cause the device to execute the method of the first aspect.

In a fourth aspect of the present disclosure, a computer-readable storage medium is provided. A computer program is stored on the medium, and the program, when executed by a processor, implements the method of the first aspect.

It should be understood that, what is described in the Summary is not intended to limit key features or important features of the embodiments of the present disclosure, nor is it intended to limit the scope of the present disclosure. Other features of the present disclosure will become readily understood from the following description.

BRIEF DESCRIPTION OF THE DRAWINGS

The above and other features, advantages and aspects of various embodiments of the present disclosure will become more apparent in combination with the drawing and with reference to the following detailed description. In the drawings, the same or similar reference signs refer to the same or similar elements, wherein.

DETAILED DESCRIPTION OF EMBODIMENTS

Figure 1:
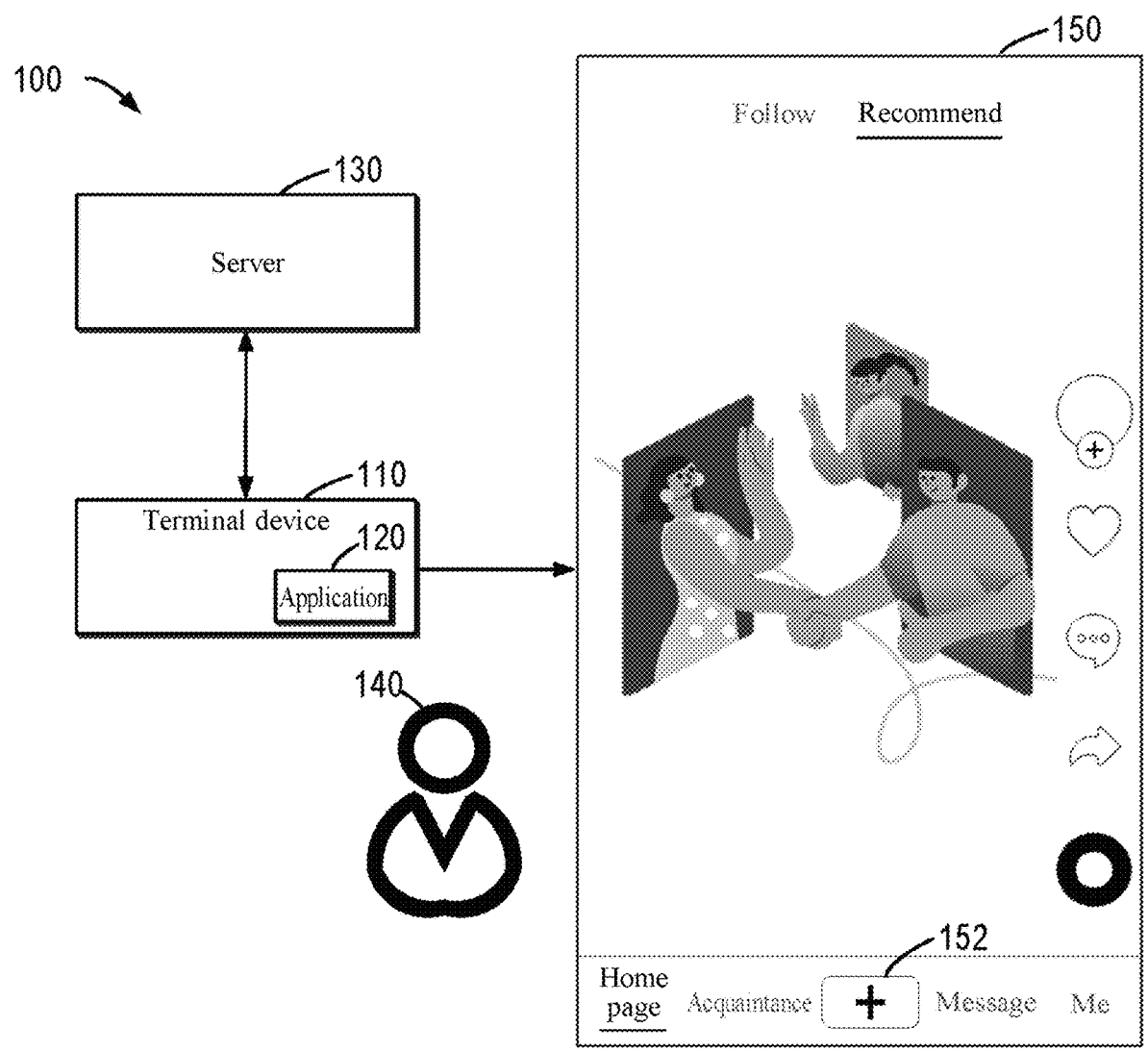
FIG. 1 illustrates a schematic diagram of an example environment in which embodiments of the present disclosure may be implemented.

Embodiments of the present disclosure will be described below in more detail with reference to the drawings. Although some embodiments of the present disclosure are shown in the drawings, it should be understood that, the present disclosure can be implemented in various forms and should not be construed as limited to the embodiments set forth herein, and these embodiments are provided for a more thorough and complete understanding of the present disclosure on the contrary. It should be understood that the drawings and embodiments of the present disclosure are only for exemplary purposes, and are not intended to limit the protection scope of the present disclosure.

In the description of the embodiments of the present disclosure, the term "including" and similar terms should be understood as open-ended inclusions, that is, "including but not limited to". The term "based on" should be understood to mean "at least partially based on". The term "one embodiment" or "the embodiment" should be understood to mean "at least one embodiment". The term "some embodiments" should be understood to mean "at least some embodiments." Other explicit and implicit definitions may also be included below.

FIG. 1 illustrates a schematic diagram of an example environment 100 in which embodiments of the present disclosure can be implemented. In the example environment 100, an application 120 is installed in a terminal device 110. The application 120 may be a content sharing application, which is capable of providing a user 140 with services related to multimedia content consumption, including browsing, commenting, forwarding, creating (e.g., photographing and/or editing), publishing, and the like of multimedia content. As used herein, the "multimedia content" can be content in various forms, including videos, audios, images, image sets, text, and the like. In some embodiments, the terminal device 110 is in communication with a server 130, so as to implement the supply for the services of the application 120.

The terminal device 110 can be any type of mobile terminals, stationary terminals or portable terminals, including mobile phones, desktop computers, laptop computers, notebook computers, netbook computers, tablet computers, media computers, multimedia tablet computers, personal communication system (PCS) devices, personal navigation devices, personal digital assistants (PDAs), audio/video players, digital cameras/camcorders, positioning devices, television receivers, wireless radio receivers, e-book devices, gaming devices, or any combination of the foregoing devices, accessories and peripherals including these devices or any combination thereof. In some embodiments, the terminal device 110 is also capable of supporting any type of user-orientated interfaces (such as a "wearable" circuit). The server 130 is various types of computing systems/servers, which are capable of providing computing power, including, but are not limited to, mainframes, edge computing nodes, computing devices in cloud environments, and so on.

In the environment 100 shown in FIG. 1, in a case where the application 120 is in an active state, the terminal device 110 may present a page 150 of the application 120 to the user 140. In the example shown in FIG. 1, the page 150 is a playing page, which is used for presenting multimedia content in a home page of the application 120. The application 120 at least has a creation function, so as to allow the user 140 to create multimedia content by means of the creation function. The creation function of the application 120 may include a photographing function for photographing multimedia content, where a photographing apparatus, such as a camera, of the terminal device 110 will be activated by the activation of the photographing function. Alternatively or additionally, the creation function of the application 120 may further include an uploading function for uploading the photographed multimedia content, so as to allow the user 140 to perform creation by using the local multimedia content in the terminal device 110 or the existing multimedia content of other remote data sources.

In the example shown in FIG. 1, the page 150 presented by the application 120 includes a creation user interface element 152 for the creation function. In a case where the user selects the creation user interface element 152 in the page 150, the application 120 may enter a creation mode from the current browsing mode, so as to begin to create multimedia content.

It should be noted that, although the creation user interface element 152 is shown in the page 150 in FIG. 1, in some implementations, a user interface element that is associated with the activation of the photographing function of application 120 may be hidden in a next-level menu, the user 140 may need to perform multiple operations to select the user interface element.

In addition to the creation function, in some embodiments, the application 120 may also have an editing function for editing multimedia content, so that the user can edit the photographed or uploaded multimedia content. The application 120 may also have a publishing function, which allows the user 140 to publish the created multimedia content.

It should be understood that, the structures and functions of the environment 100 are described for exemplary purposes only and do not imply any limitation on the scope of the present disclosure. For example, the page 150 shown in FIG. 1 is only an example page of the application, and there may be various page designs in fact.

Traditionally, the user interface element that is associated with the activation of content creation in the application may be placed at a specific location on the page. The user actively finds and activates the user interface element when the user has an intention to perform creation, so as to create multimedia content. Therefore, the creation of the multimedia content completely depends on the initiative of the user. For applications involving content sharing, the user is often expected to create and publish more content. Therefore, it is expected to provide guidance and incentives for user creation, so that the user can participate in content creation more conveniently and actively.

Embodiments of the present disclosure propose a solution for user guidance. In the solution, creation guidance information for the user is presented in an active page of an application, so as to guide or motivate the user to use the creation function of the application. Based on interaction with a visual representation of the creation guidance information, the current active page of the application is switched to a creation page associated with the creation function. According to the solution, by using the creation guidance information to guide or motivate the user to use the creation function, and providing a skip to the creation page on the appropriate active page, the user can create multimedia content more conveniently and quickly.

Some example embodiments of the present disclosure will be described below with continued reference to the drawings.

Figure 2:
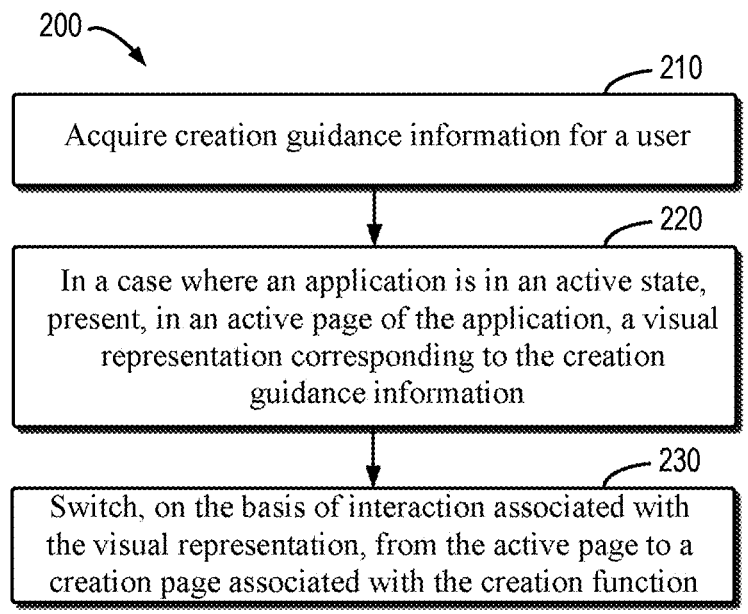
FIG. 2 illustrates a flow diagram of a process for user guidance according to some embodiments of the present disclosure.

FIG. 2 illustrates a flow diagram of a process 200 for user guidance according to some embodiments of the present disclosure. The process 200 may be implemented at the terminal device 110. For ease of discussion, the process 200 will be described with reference to the environment 100 shown in FIG. 1.

At block 210, the terminal device 110 acquires creation guidance information for the user 140. The creation guidance information is used for guiding the user 140 to use the creation function of the application 120.

In some embodiments, the creation guidance information may be based on a historical usage condition of the user 140 on the application 110. The historical usage condition may include the historical usage condition of the user on a specific function of the application 120 (e.g., a creation function, a publishing function, a browsing function, a commenting function, and the like). For example, the historical usage condition may include whether the user 140 has used the creation function of the application 120, the number of instances of using a creation mode of the creation function, whether multimedia content has been published in the application 120, the frequency, quantity, duration of publishing the multimedia content, and the like, and the type of the published multimedia content. In addition, the historical usage condition may also include the presented specifics of the user 140 browsing the displayed multimedia content in the application 120, such as a browsing time length, a preferred multimedia content type, the frequency of comments and likes, and so on. Alternatively or additionally, in some embodiments, the creation guidance information may also be based on personal profile information of the user 140, the historical usage conditions of the application 120 by other users, and other information that is conducive to determining the guidance for the user.

By means of the historical usage conditions of the user 140 and/or other users, and the personal profile information of the user 140, and the like, it is possible to determine an use intention of the user 140 for the creation function, an intention to publish multimedia content in the application, a preference to a specific creation mode of the creation function, and/or a preference to an editing function for editing multimedia content during a creation process, etc. The creation guidance information acquired by the terminal device 110 may reflect one or more of factors reflecting these aspects, and thus can provide more targeted guidance for the user 140.

In some embodiments, the terminal device 110 may receive part or all of the creation guidance information from the server 130. In other words, the server 130 may generate part or all of the creation guidance information. The server 130 may send part or all of the generated creation guidance information to the terminal device 110. In some embodiments, the terminal device 110 may generate part or all of the creation guidance information.

The creation guidance information may include various kinds of information that is capable of guiding or motivating the user to use the creation function. Specific examples of the creation guidance information will be discussed in more details below and will be illustrated by means of the drawings.

The acquired creation guidance information is presented to the user. At block 220, in a case where the application 120 is in the active state, the terminal device 110 presents, in an active page of the application 120, a visual representation corresponding to the creation guidance information. The active page of the application 120 refers to a page that the application 120 in the active state currently presents to the user 140. On which an active page or active pages the visual representation corresponding to the creation guidance information is specifically presented may be determined on the basis of the type, the manner of presentation, and a guidance effect on the user of the creation guidance information, etc.

In some embodiments, the terminal device 110 may present, in a page that the application 120 is about to display after the application is switched from an inactive state to the active state, the visual representation corresponding to the creation guidance information. The application 120 being switched to the active state means that the user 140 has an intention to use the application 120 at present, and the creation guidance information can be presented at this time to better match the intention of the user, so that the user 140 can conveniently and quickly activate the creation function.

The switching of the application 120 from the inactive state to the active state may be implemented by a cold start or a warm start of the application 120. The so-called cold start means that when the application is started, system program codes and application codes both are not in a memory, and need to be extracted from a magnetic disk. For example, the application is started for the first time after system start or restart; or the application is turned off after being started, and then is restarted after a relatively longer period of time. The so-called hot start means that when the application is started, most system codes already exist in the memory. For example, after the application is started for the first time, the application is restarted within a short time.

In some embodiments, the terminal device 110 may also detect that the user 140 is browsing a specific page and determine to present the creation guidance information in the specific page, when the application 120 is in the active state.

In some embodiments, the presentation of the creation guidance information in the active page may depend on various trigger conditions. For example, the terminal device 110 may present the visual representation corresponding to the creation guidance information every time after the application 120 is switched from the inactive state to the active state or when the application 120 displays a specific active page. As another example, the terminal device 110 may present the creation guidance information only once in one day or other predetermined time periods. In a case where the application 120 is switched from the inactive state to the active state again within a predetermined time period, the creation guidance information will no longer be presented. In some embodiments, the trigger conditions for presenting different creation guidance information may be different.

At block 230, the terminal device 110 switches, on the basis of interaction associated with the visual representation corresponding to the creation guidance information, from the active page of the application 120 to a creation page associated with the creation function. Thus, the presentation of the creation guidance information can guide and motivate the user to use the creation function more frequently.

To better understand example embodiments of presentation and interaction of the creation guidance information, a description will be given below with reference to an example user interface.

In some embodiments, when presenting the visual representation corresponding to the creation guidance information, the terminal device 110 may add a superimposed layer to the active page for presentation, and place the superimposed layer on a top layer of the active page. The visual representation corresponding to the creation guidance information is presented in the superimposed layer, so that the creation guidance information can be displayed more prominently.

Figures 3A, 3B, 3C, 3D:
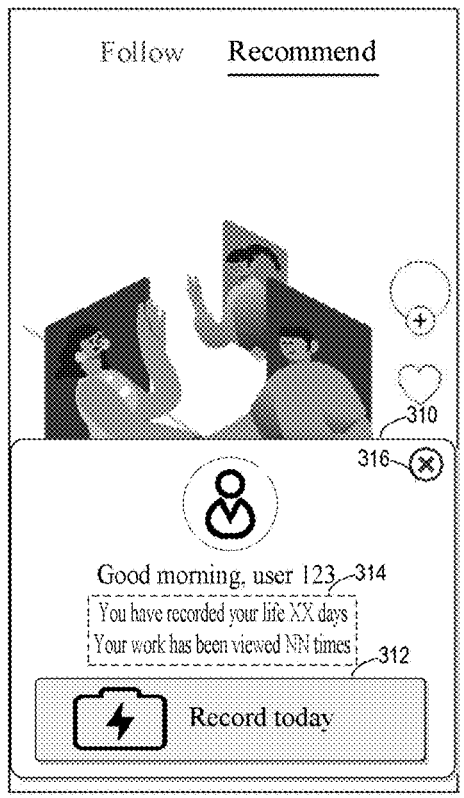
FIGS. 3A-3D, FIG. 4 and FIG. 5 illustrate schematic diagrams of examples of a page of an application according to some embodiments of the present disclosure.

FIG. 3A and FIG. 3B illustrate some example active pages for presenting the creation guidance information in the application 120. In an active page 300A shown in FIG. 3A, a superimposed layer 310 is added to present the visual representation of creation information. The superimposed layer 310 is implemented, for example, in the form of a pop-up window. In an active page 300B of FIG. 3B, a superimposed layer 320 is added to present the visual representation of the creation information. The superimposed layer 320 is implemented, for example, in the form of a bubble prompt box.

In some examples, after the application 120 enters the active state through the cold start or warm start, the superimposed layer 310 or 320 is added to the active page 300A or 300B to be presented, and the visual representation corresponding to the creation guidance information is presented on the superimposed layer 310 or 320.

In some embodiments, the creation guidance information may indicate the creation function of the application 120. For example, when the visual representation corresponding to such creation guidance information is presented, a creation user interface element for activating the creation function may be presented in the active page, such as, a creation user interface element 312 in the superimposed layer 310 shown in FIG. 3A. The creation user interface element 312 is available for selection by the user. In a case where the user selects the creation user interface element 312, such as by clicking or the like, the creation function of the application 120 will be activated. Correspondingly, the application 120 will be switched from the current active page 300A to the creation page associated with the creation function. Examples of the creation page will be described below.

In some embodiments, the creation guidance information may indicate the location of the creation function of the application 120 in the current page of the application 120, so that the user 140 can conveniently learn the creation function of the application 120. In the example shown in FIG. 3B, the superimposed layer 320, presented as a bubble prompt box, points in the form of an arrow to a creation user interface element 322 for activating the creation function in the active page 300B. Such presentation of the creation guidance information can guide the user to pay attention to the creation function and learn how to activate the creation function. Similarly, the selection of the creation user interface element 322 may also activate the creation function of the application 120.

In some embodiments, the creation guidance information may indicate related historical usage conditions of the user 140 on the creation function of the application 120. Such historical usage conditions may be presented, for example, by visual representations such as a text form and a graphical form. For example, in the active page 300A shown in FIG. 3A, descriptive information 314 in a text form is presented in the superimposed layer 310 for indicating the historical usage condition of the user using the creation function in the application 120 "You have recorded your life XX days", and the historical usage condition of using the publishing function "Your work has been viewed NN times in total". Such descriptive information about the historical usage conditions can also encourage the user to continue to use the application 120 for content creation, and then the user can also publish the content.

In some embodiments, the creation guidance information can indicate a new mode of the user 140 related to the creation function of the application 120. For example, in a case where a new version of the application 120 is updated on the terminal device 110 and the new version provides a new mode related to the creation function, when the application 120 in the new version is started for the first time or within a period of time, the creation guidance information is presented to indicate the new mode related to the creation function. Such guidance can motivate the curiosity of the user on the new mode, so as to actively use the creation function. Indications of the new mode related to the creation function may be presented by various visual representations, such as a text form and a graphical representation. In the example shown in FIG. 3B, assuming that the photographing function in the creation function has a new photographing mode, descriptive information 324 in a text form and an icon 326 in a graphical form are displayed in the superimposed layer 320 of the active page 300B.

In some embodiments, when presenting the visual representation corresponding to the creation guidance information, the terminal device 110 may present the creation user interface element, which is used for activating the creation function, in the active page by means of an animation effect. By means of the dynamic visual presentation mode, the user interface element is more noticeable to the user 140, thereby motivating the use of the creation function. For example, an active page 300C shown in FIG. 3C has a creation user interface element 330, and the activation of the creation user interface element 330 will trigger a switch from the current active page to the creation page. When the application 120 is switched from the inactive state to the active state, the creation user interface element 330 may visually present an animation effect of continuous enlargement and reduction, for example, an enlarged effect of the creation user interface element 330 is shown in FIG. 3D. The size of the creation user interface element 330 may continuously and alternatively change in the examples shown in FIG. 3C and FIG. 3D. In some embodiments, the animation effect of the creation user interface element 330 may continue for a period of time and recover to a normal visual representation form after a period of time. In some examples, the creation user interface element 330 may also be displayed in such animation effect all the time.

In some scenarios, during a start process of the application 120, a start page may be presented at first, and then the home page or other active pages are presented after the start page is presented. The start page may be used for displaying activity information, promotion information, and the like. The presentation of the start page may last for a certain time. In some embodiments, the visual representation corresponding to the creation guidance information may be presented in the start page of the application 120, for example, the creation user interface element for activating the creation function is presented.

Figure 4:

FIG. 4 illustrates such an example start page 400, in which a creation user interface element 410 is presented. In a case where the creation user interface element 410 is selected in the start page 400, the application 120 is also switched from the start page 400 to the creation page. In this way, the user can be quickly guided to use the creation function during the start process of the application.

In some scenarios, the active page for presenting the creation guidance information may be a playing page for playing multimedia content. For example, some applications are designed to, in normal circumstances, directly present to the user the playing page for playing the multimedia content after being switched from the inactive state to the active state. In this case, when it is determined that the creation guidance information is to be presented, it is possible to present, in a playing area of the playing page, the creation user interface element for activating the creation function and a browsing user interface element for entering a browsing function, for the selection of the user. The creation user interface element is considered here as the creation guidance information.

Figure 5:
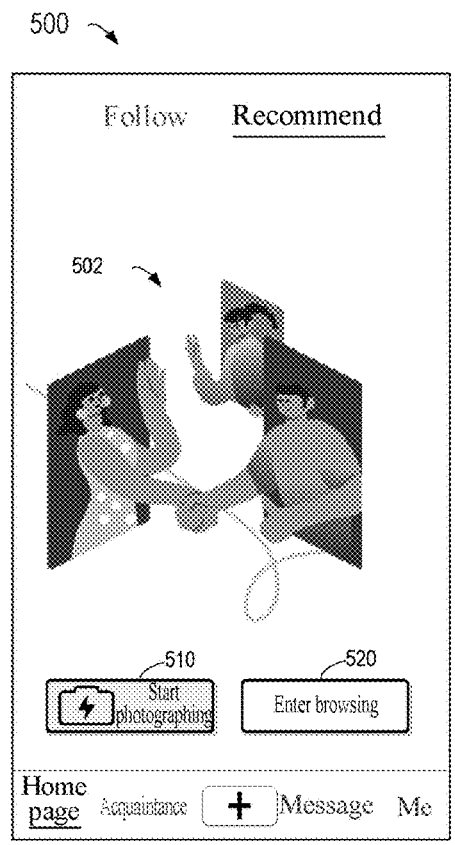

FIG. 5 illustrates a presentation example of such creation guidance information. FIG. 5 illustrates a playing page 500 presented by the application 120 after the cold start or the warm start (i.e., after being switched from the inactive state to the active state), where the playing page is used for playing multimedia content 502. Also presented in the playing page 500 are a creation user interface element 510 and a browsing user interface element 520. The creation user interface element 510 and the browsing user interface element 520 are presented, for example, in the playing area in the playing page 500 used for playing the multimedia content 502. In a case where the user 140 selects the creation user interface element 510, the application 120 is switched to the creation page, so that the user 140 can use the creation function of the application 120. It should be noted that the creation page is discussed collectively below.

Figure 6A:
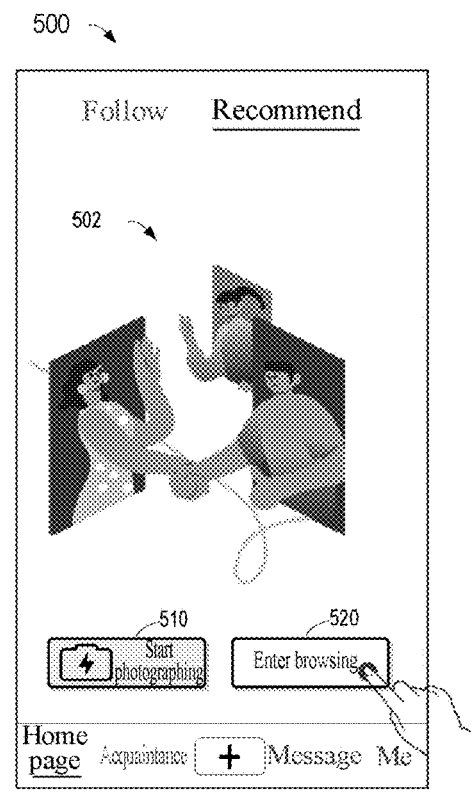
FIGS. 6A-6B and FIGS. 7A-7B illustrate schematic diagrams of examples of page interaction of an application according to some embodiments of the present disclosure.
Figure 6B:
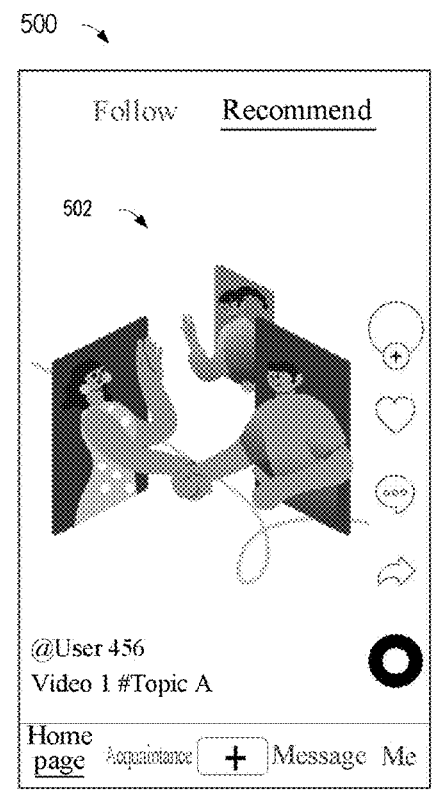

In some embodiments, in a case where the user 140 selects the browsing user interface element 520 in the playing page 500, for example, by means of a finger click and other operations, as shown in FIG. 6A, this means that the user 140 desires to enter a browsing mode. The creation user interface element 510 and the browsing user interface element 520 will cease to be presented in the playing page 500 of the application 120, as shown in FIG. 6B. The user may start normal multimedia browsing in the playing page 500 shown in FIG. 6B. In some embodiments, in addition to selecting the browsing user interface element 520, the user 140 may also be allowed to stop the presentation of the creation user interface element 510 and the browsing user interface element 520 in other ways. For example, the user 140 may exit the presentation of the creation user interface element 510 and the browsing user interface element 520 by clicking elsewhere in the playing area of the multimedia content 502 than the creation user interface element 510 and the browsing user interface element 520.

Figure 7A:
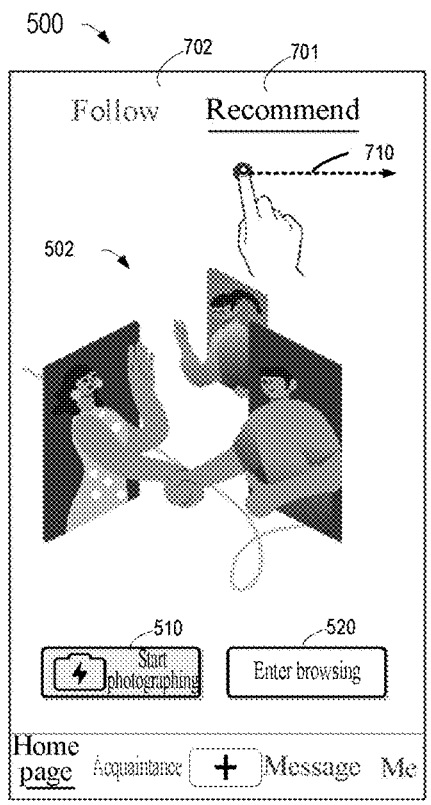
Figure 7B:
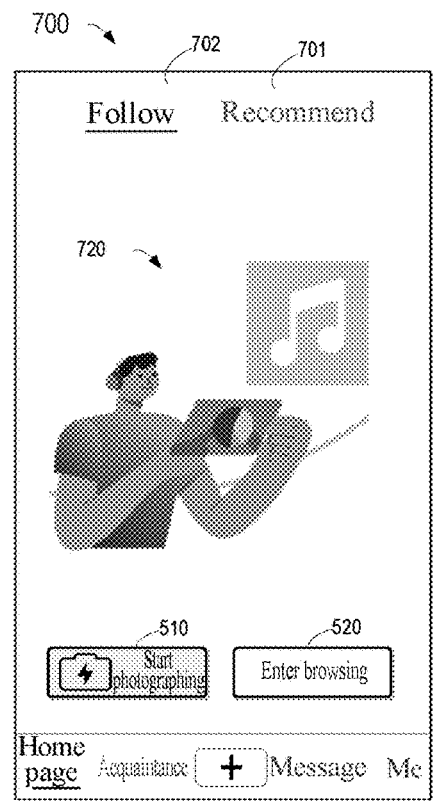

In some embodiments, in a case where the playing page 500 has multiple page tags and part or all of the page tags may be used for playing multimedia content, the switching of the user 140 among the multiple page tags may not trigger the stop of the presentations of the creation user interface element 510 and the browsing user interface element 520. As shown in FIG. 7A, in a case where a switching instruction is received from the user 140 in the playing page 500, such as a switching instruction triggered by a sliding input 710, the application 120 is switched from the current page tag 701 (which is sometimes referred to as a "first page tag") to another page tag 702 (which is sometimes referred to as a "second page tag"). The application 120 will play, in a page 700 shown in FIG. 7, multimedia content 720 corresponding to the page tag 702, while maintaining the presentations of the creation user interface element 510 and the browsing user interface element 520. That is to say, in a case where the user 140 explicitly selects to enter either the browsing mode or the creation mode, the creation user interface element 510 and the browsing user interface element 520 may be continuously presented.

In some embodiments, in a case where it is determined that the user 140 selects other page tags in the playing page 500, and the selected page tag is not a playing page, but, for example, a message list page, a personal home page and the like, then the creation user interface element 510 and the browsing user interface element 520 may be stopped from being presented.

Figure 8:
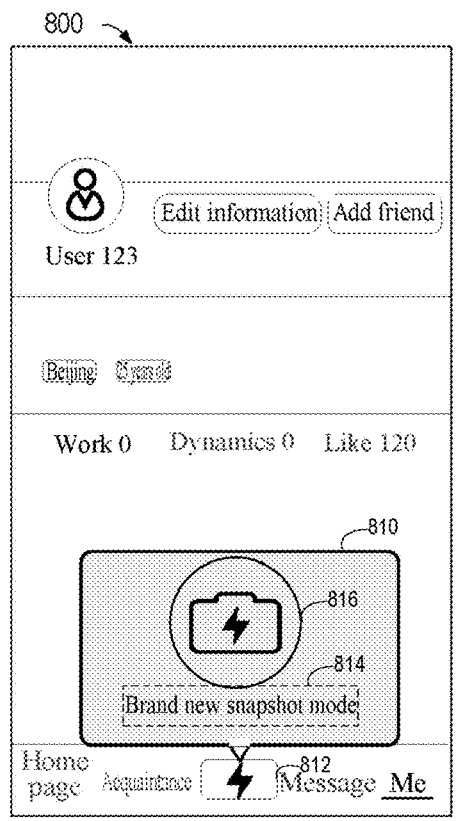
FIGS. 8-10 illustrate schematic diagrams illustrate examples of a page of an application according to some embodiments of the present disclosure.

In some embodiments, in addition to being displayed in the active page presented when the application 120 is switched to the active state, the creation guidance information may also be displayed in other pages of the application 120. In one embodiment, in a case where the application 120 displays the personal home page of the user on the basis of the operation of the user, such as a personal home page 800 shown in FIG. 8, the visual representation corresponding to the creation guidance information may also be presented on the page, for example, presented by a superimposed layer 810 in the form of a bubble prompt box. The superimposed layer 810 may be similar to the superimposed layer 320 shown in FIG. 3B, which points in the form of an arrow to the location of a creation user interface element 812 for activating the creation function in the personal home page 800. Alternatively or additionally, similar to the superimposed layer 320 shown in FIG. 3B, it is also possible to display, in the superimposed layer 810, more creation guidance information by means of descriptive information 814 in the text form and an icon 816 in the graphical form.

In some embodiments, in a case where the user 140 does not publish multimedia content in the application 120, the visual representation corresponding to the creation guidance information may be presented to indicate the location of the creation user interface element in the current active page, thereby helping the user 140 understand how to find and start the creation function. For example, in the example shown in FIG. 8, the personal home page 800 of the user 140 has no publication of works (i.e., multimedia content), so the creation guidance information can be presented through the superimposed layer 810. Of course, in the case where the user 140 does not publish multimedia content, in addition to or as an alternative to presenting such creation guidance information in the personal home page 800, the creation guidance information may also be presented in other active pages, for example, as those in the above FIG. 3A, FIG. 3B, FIG. 4 and FIG. 5.

In some embodiments, the creation guidance information may not generally indicate the creation function of the application 120, but may provide the user with creation guidance that is more personalized or more in line with the preference of the user. For example, as mentioned above, in a case where the creation function includes the photographing function, the creation guidance information can indicate the preference of the user 140 to the creation mode of the creation function of the application 120. In some embodiments, in a case where it is determined that a specific mode of the photographing function is a photographing mode of interest to the user 140, for example, it is determined that the user 140 continuously likes to use such a photographing mode or because a newly introduced photographing mode is something that the user 140 may be willing to try, such a photographing mode may be determined to be a recommended photographing mode. The creation guidance information may be determined to indicate such a recommended photographing mode.

When presenting the visual representation corresponding to the creation guidance information, the terminal device 110 may deform the creation user interface element in the active page of the application 120 into a style corresponding to the recommended photographing mode. In this way, the user can be visually attracted to understand and use the creation function more intuitively. For example, in the examples shown in FIGS. 3A-3D, FIG. 5 and FIG. 8, the creation user interface elements 312, 322, 330, 510 and 812 have a style corresponding to the recommended photographing mode (e.g., a "snapshot mode"). In contrast, the creation user interface element 410 shown in FIG. 4 may be considered to have a general style.

In some embodiments, in a case where the application 120 further includes an editing function, the creation guidance information may indicate the preference of the user 140 to the editing function for editing multimedia content. The editing function of the application 120 may be varied. As an example, the application 120 may have a special effect editing function, which is used for adding a special effect to the edited multimedia content (e.g., videos, images and the like). The application 120 may also have a filter function, which is used for applying a specific filter to the edited multimedia content. Other editing functions of the application 120 may also include, for example, a music adding function, a voice changing function, a sticker adding function, and the like. In some embodiments, some editing functions may also have multiple editing modes, and different editing modes may indicate different manners of the multimedia content. For example, different special effect editing modes in the special effect editing function correspond to different special effects, different filter modes in the filter function correspond to different filters, and different editing modes in the music adding function correspond to different music types or the addition of different music types. The editing modes of other editing functions may be divided similarly.

In some embodiments, in a case where it is determined that a particular editing function is an editing function of interest to the user 140, for example, it is determined that the user 140 likes the multimedia content edited in the editing mode, prefers to use the editing mode to edit the multimedia content, or the editing mode is newly introduced and something which the user 140 may be willing to try, and such an editing mode may be determined to be a recommended editing mode. The creation guidance information may be determined to indicate such a recommended editing mode.

When presenting the visual representation corresponding to the creation guidance information, the terminal device 110 may deform the creation user interface element in the active page of the application 120 into a style corresponding to sample multimedia content that is edited in the recommended editing mode. In this way, the user can be visually attracted to understand and use the creation function more intuitively. For example, a creation user interface element 920 in an active page 900 has a style corresponding to a recommended special effect editing mode (e.g., an "oil painting filter").

Figure 10:
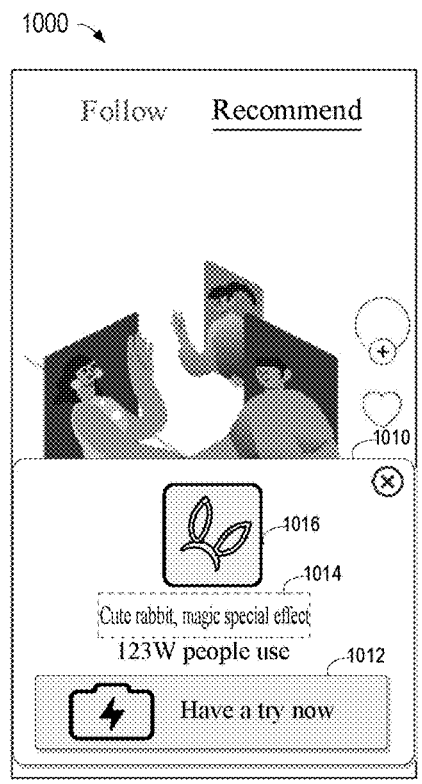

In some embodiments, in addition to being indicated by deforming the creation user interface element, the recommended editing mode may also be indicated by other forms of creation guidance information. For example, in the example shown in FIG. 10, compared with the active page 300A shown in FIG. 3A, both descriptive information 1014 in the text form and an icon 1016 in the graphical form, which are presented in a superimposed layer 1010 added on an active page 1000, may indicate a particular recommended special effect editing mode.

In some embodiments, the creation guidance information indicating the recommended editing mode may also be presented in a corresponding active page when the user 140 browses the multimedia content edited in the recommended editing mode. For example, the terminal device 110 determines whether the active page of the application 120 presents the multimedia content edited in the recommended editing mode. For example, in the example shown in FIG. 9, it is assumed that the user is browsing multimedia content 910, which is edited in the editing mode of "oil painting filter".

In a case where the active page of the application 120 is presenting the edited multimedia content, the terminal device 110 may present, in the active page, the visual representation corresponding to the creation guidance information, such as the deformed creation user interface element 920, so as to indicate the recommended editing mode. In some embodiments, when the multimedia content edited in the recommended editing mode is presented, the recommended editing mode of "oil painting filter" may also be indicated by creation guidance information in other forms, such as a visual representation 930 in the form of graphics and text shown in FIG. 9. When the user browses similar content, an editing mode for generating such content is recommended at the same time. Therefore, it is easier to motivate the user to use the creation function to generate similar content.

In some embodiments, in a case where the creation guidance information is to be presented during the user 140 browsing the application 120, when it is determined that the user 140 has a creation intention to publish or edit multimedia content, the presentation of such creation guidance information may be provided, so as to avoid excessive distraction to the user. For example, in FIG. 9, when it is determined that the user may desire to photograph multimedia content or publish multimedia content, the creation guidance information for indicating the recommended editing mode of "oil painting filter" may be presented to the user.

Some example embodiments of the presentation of the creation guidance information are described above. It should be understood that the presentation of the creation guidance information shown above is only some examples, and the creation guidance information and the presentation manners thereof in different embodiments can be combined in one embodiment, or the creation guidance information and the presentation manners thereof in the same embodiment can be implemented in different embodiments. For example, the superimposed layer 810 in the active page 800 shown in FIG. 8 may present creation guidance information similar to that of the superimposed layer 1010 shown in FIG. 10. The embodiments of the present disclosure are not limited in this regard.

Figure 11A:
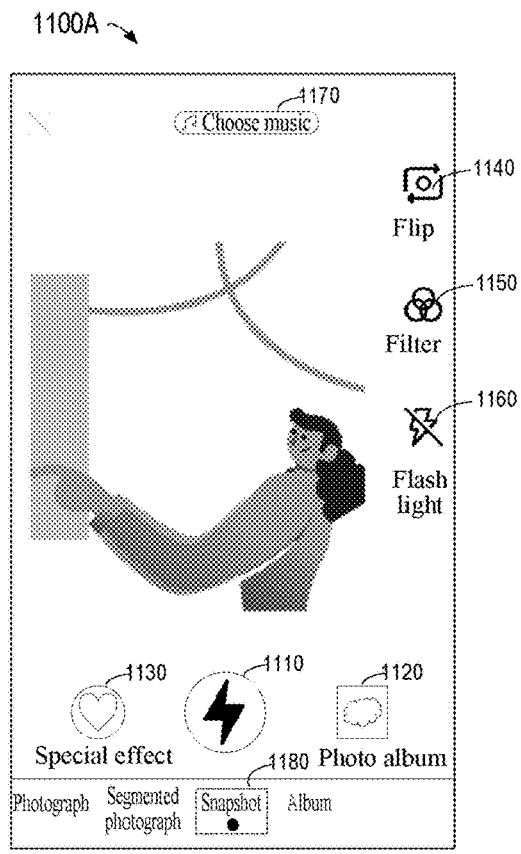
FIGS. 11A-11C illustrate schematic diagrams of examples of a creation page of an application according to some embodiments of the present disclosure.
Figures 11B, 11C:
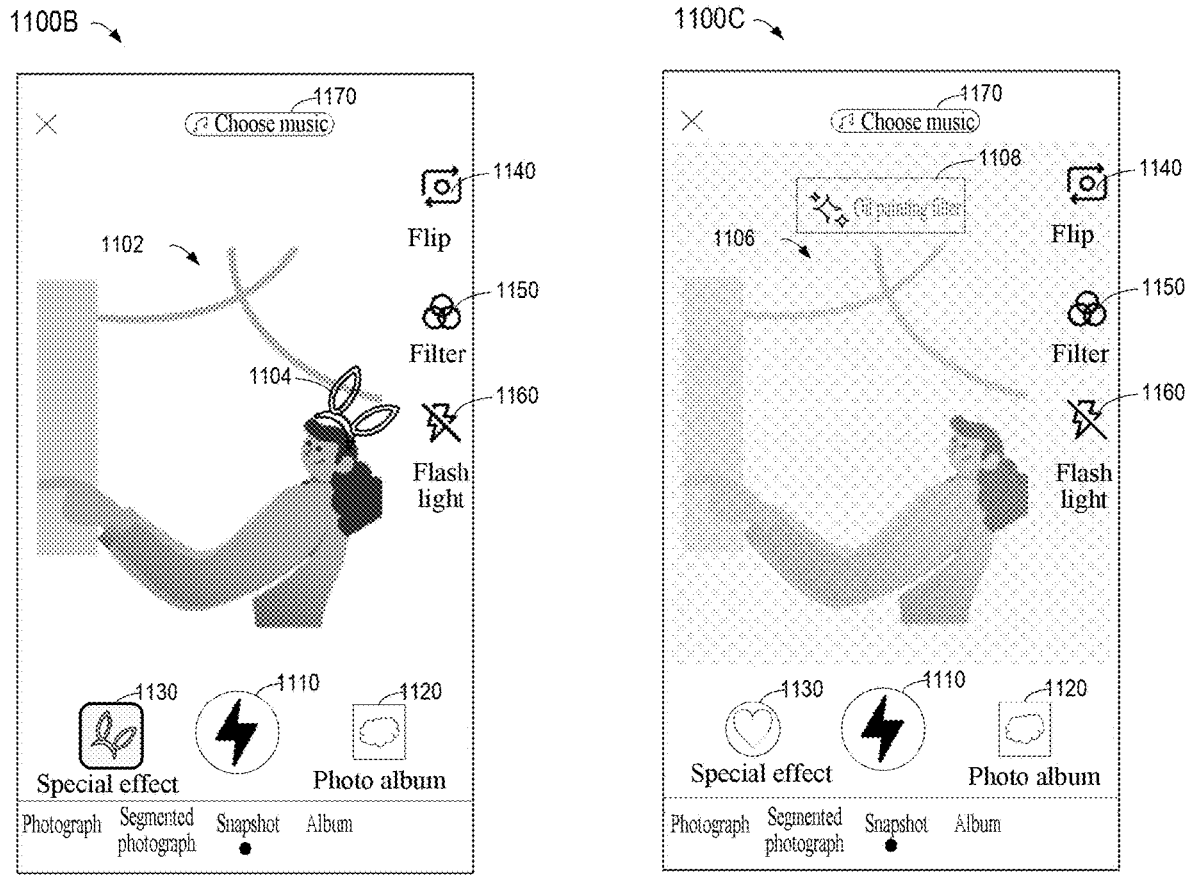

As mentioned above, in the page presenting the creation guidance information, in a case where the user selects the creation user interface element that serves as the creation guidance information or activates the creation function according to the guidance of the presented creation guidance information, the application 120 will be switched from the current page to the creation page. FIGS. 11A-11C illustrate some examples of the creation page of the application 120. The creation page is associated with the creation function of the application 120, for example, providing functions such as photographing and editing of multimedia content.

Referring first to FIG. 11A, in which a creation page 1100A is shown. The creation page 1100A has a photographing user interface element 1110, which may be selected to activate the photographing of multimedia content, for example, photographing videos, images, and the like. The creation page 1100A also has an album user interface element 1120, which may be selected to allow the user to upload multimedia content from local or other data sources for subsequent creation.

The creation page 1100A also has a user interface element for activating the editing function, so as to edit the photographed or uploaded multimedia content. As an example, the user interface element for activating the editing function includes, but is not limited to: a special effect user interface element 1130 for activating a special effect editing function; a flip user interface element 1140 for activating a flip function, so as to flip a presentation direction of the created multimedia content in the page; a filter user interface element 1150 for activating a filter function; a flash light user interface element 1150 for turning on or turning off a flash light of the terminal device 110; and a music adding user interface element 1170 for activating a music adding function, so as to add music to the created multimedia content. It should be understood that, what is shown in FIG. 11A is only an example editing function, and there may be more, less or different editing functions in the creation page as needed.

In some embodiments, in a case where the creation guidance information presented in the active page indicates the recommended photographing mode of the photographing function of the application 120, after switching to the creation page, the creation page will be presented as a creation page associated with activating the photographing function by the recommended photographing mode. For example, in a case where the creation user interface elements 312, 322, 330, 510 and 812 in the examples shown in FIGS. 3A-3D, FIG. 5 and FIG. 8 are selected, after the page shown in FIGS. 3A-3D, FIG. 5 and FIG. 8 is switched to the creation page, as shown in FIG. 11A, the photographing function is positioned to a recommended photographing mode 1180 (e.g., a "snapshot mode"). In this way, the user can quickly use the desired photographing mode for photographing. In some embodiments, in a case where the creation guidance information does not indicate a particular photographing mode, after the creation page is switched to, the photographing function may be positioned to a default photographing mode.

In some embodiments, in a case where the creation guidance information presented in the active page indicates the recommended editing mode, after the creation page is switched to, the recommended editing mode may be automatically applied to the created multimedia content in the creation page, so as to present the multimedia content automatically edited in the recommended editing mode.

In the example shown in FIG. 11B, it is assumed that the recommended editing mode is a recommended special effect editing mode, such as the special effect editing mode indicated by a creation user interface element 1012 in an active page 1000 shown in FIG. 10. After the creation user interface element 1012 in the active page 1000 is selected, the application 120 is switched to a creation page 1100B. In the creation page 1100B, a special effect user interface element 1130 is deformed to indicate the recommended special effect editing mode, and multimedia content 1102, which is being created in the current creation page 1100B, is automatically edited, so as to add a special effect 1104 to an object in the multimedia content 1102.

Figure 9:
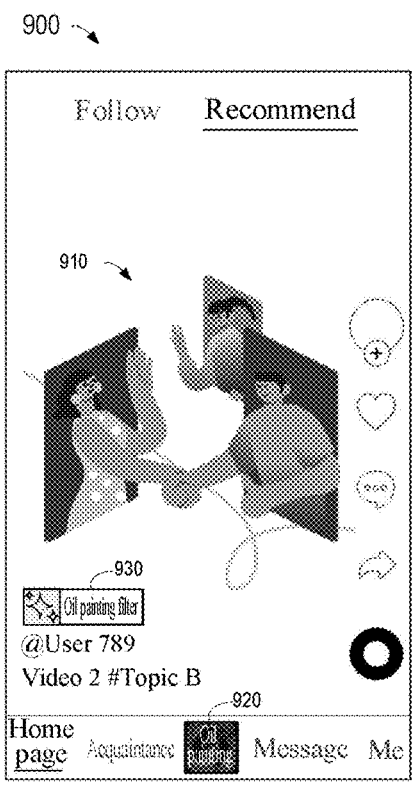

In the example shown in FIG. 11C, it is assumed that the recommended editing mode is a recommended filter mode, such as the filter mode indicated by the creation user interface element 920 in the active page 900 shown in FIG. 9, such as the "oil painting filter". After the creation user interface element 920 in the active page 900 is selected, the application 120 is switched to a creation page 1100C. In the creation page 1100C, multimedia content 1106, which is being created, is automatically edited in the corresponding recommended filter mode, for example, to present an effect of "oil painting filter". An indication 1108 about the used recommended filter mode may also be presented in the creation page 1100C.

In the example show in FIGS. 11A-11C, multimedia content is photographed after the photographing user interface element is selected in the creation page. In other embodiments, after the creation page is switched to, the photographing function of the creation page may be directly activated to photograph the multimedia content.

During the start of the application 120, since the application 120 may present multimedia content with sound, such as a video, audio and the like with sound, in some embodiments, in a case where the application 120 is switched to the active state and the current active page is a playing page used for presenting multimedia content with a target volume, the terminal device 110 may also perform content presentation on the basis of a predetermined volume rather than the own target volume of the multimedia content to be presented currently. The predetermined volume selected by the terminal device 110 is lower than the own target volume of the multimedia content. In some examples, the predetermined volume may be zero.

When performing content presentation, the terminal device 110 may initially set the playing volume of the multimedia content to the predetermined volume (for example, mute by default, or a lower volume). In some embodiments, in a case where the multimedia content is a video and the playing volume is set to mute, the overall playing of the multimedia content may be paused, or only a picture is played without sound.

In some embodiments, the terminal device 110 may present the multimedia content at the predetermined volume for a predetermined time period (e.g., 2 seconds, 3 seconds, 5 seconds and the like). In a case where no operation instruction on the multimedia content is received within the predetermined time period, for example, the user clicks to play or raise the volume, then the terminal device 110 may present the multimedia content at the target volume after the predetermined time period expires.

In some embodiments, after the playing volume of the multimedia content is initially set to the predetermined volume, the terminal device 110 may gradually increase the playing volume of the multimedia content from the predetermined volume while presenting the multimedia content, until reaching the target volume. That is to say, the playing volume of the multimedia content is gradually increased. This gradually increasing process can give the user some buffer time.

Figure 12:
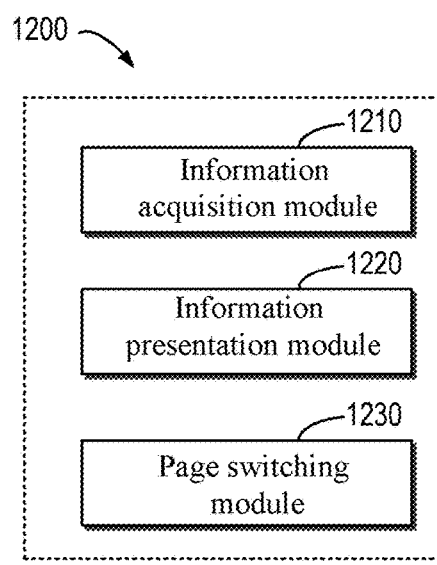
FIG. 12 illustrates a block diagram of an apparatus for user guidance according to some embodiments of the present disclosure.

FIG. 12 illustrates a schematic structural block diagram of an apparatus 1200 for user guidance according to some embodiments of the present disclosure. The apparatus 1200 may be implemented as or included in the terminal device 110. Various modules/components in the apparatus 1200 may be implemented by hardware, software, firmware, or any combination thereof.

As shown in the figure, the apparatus 1200 includes an information acquisition module 1210 configured to acquire creation guidance information for a user, and the creation guidance information is used for guiding the user to use a creation function, which is used for creating multimedia content, in an application. The apparatus 1200 further includes an information presentation module 1220 configured to, in a case where the application is in an active state, present, in an active page of the application, a visual representation corresponding to the creation guidance information. The apparatus 1200 further includes a page switching module 120, configured to switch, on the basis of the interaction associated with the visual representation, from the active page to a creation page associated with the creation function.

In some embodiments, the creation function includes at least one of the following: a photographing function for photographing multimedia content and an uploading function for uploading local multimedia content.

In some embodiments, the active page includes a page to be presented after the application is switched from an inactive state to the active state.

In some embodiments, the information presentation module 1220 is configured to: in a case where the active page is a start page of the application, present, in the start page, a creation user interface element for activating the creation function. In some embodiments, the page switching module 1230 is configured to: in a case where the creation user interface element is selected in the start page, switch from the start page to the creation page.

In some embodiments, the information presentation module 1220 is configured to: in a case where the active page is a playing page for playing multimedia content, present, in a playing area of the multimedia content, a creation user interface element for activating the creation function and a browsing user interface element for entering a browsing function. In some embodiments, the page switching module 1230 is configured to: in a case where the creation user interface element is selected in the playing page, switch from the playing page to the creation page.

In some embodiments, the apparatus 1200 further includes at least one of the following: a presentation stop module configured to, in a case where the browsing user interface element is selected in the playing page, stop presenting the creation user interface element and the browsing user interface element in the playing page; and a tag switching presentation module configured to, in a case where the playing page is switched from a first page tag to a second page tag while the creation user interface element and the browsing user interface element are presented, maintain the presentation of the creation user interface element and the browsing user interface element while playing the multimedia content corresponding to the second page tag.

In some embodiments, the information presentation module 1220 is configured to: add a superimposed layer in the active page, where the superimposed layer is placed on a top layer of the active page; and present, in the superimposed layer, the visual representation corresponding to the creation guidance information.

In some embodiments, the creation function includes a photographing function, and the creation guidance information indicates a recommended photographing mode of the photographing function. In some embodiments, the information presentation module 1220 is configured to: deform the creation user interface element in the active page into a style corresponding to the recommended photographing mode. In some embodiments, the page switching module 1230 is configured to: in response to the creation user interface element being selected, switch from the active page to the creation page associated with activating the photographing function in the recommended photographing mode.

In some embodiments, the creation guidance information indicates a recommended editing mode for editing multimedia content. In some embodiments, the information presentation module 1220 is configured to: determine whether the active page presents multimedia content edited in the recommended editing mode; and in a case where it is determined that the active page presents the edited multimedia content, present, in the active page, the visual representation corresponding to the creation guidance information, so as to indicate the recommended editing mode.

In some embodiments, the creation guidance information indicates a recommended editing mode for editing multimedia content. In some embodiments, the information presentation module 1220 is configured to: deform the creation user interface element in the active page into a style corresponding to sample multimedia content edited in the recommended editing mode. In some embodiments, the page switching module 1230 is configured to: in response to the creation user interface element being selected, switch from the active page to the creation page for activating the creation function; and present, in the creation page, multimedia content automatically edited in the recommended editing mode.

In some embodiments, the application further includes a publishing function for publishing multimedia content. In some embodiments, the information presentation module 1220 is configured to: in a case where the user does not publish multimedia content in the application, present the visual representation corresponding to the creation guidance information, so as to indicate the location, in the active page, of the creation user interface element for activating the creation function.

In some embodiments, the creation guidance information is related to at least one of the following: a preference of the user to a creation mode of the creation function, a preference of the user to an editing function for editing multimedia content, and an intention of the user to publish multimedia content in the application.

In some embodiments, the apparatus 1200 further includes: a volume adjustment presentation module configured to: in a case where the application is switched to the active state and the active page is a playing page for presenting multimedia content with a target volume, present the multimedia content on the basis of a predetermined volume, and the predetermined volume is less than the target volume.

In some embodiments, the volume adjustment presentation module is configured to: present the multimedia content at the predetermined volume for a predetermined time period; and in a case where the predetermined time period expires, present the multimedia content at the target volume.

In some embodiments, the volume adjustment presentation module is configured to: while the multimedia content is being presented, gradually increase the playing volume of the multimedia content from the predetermined volume, until reaching the target volume.

Figure 13:
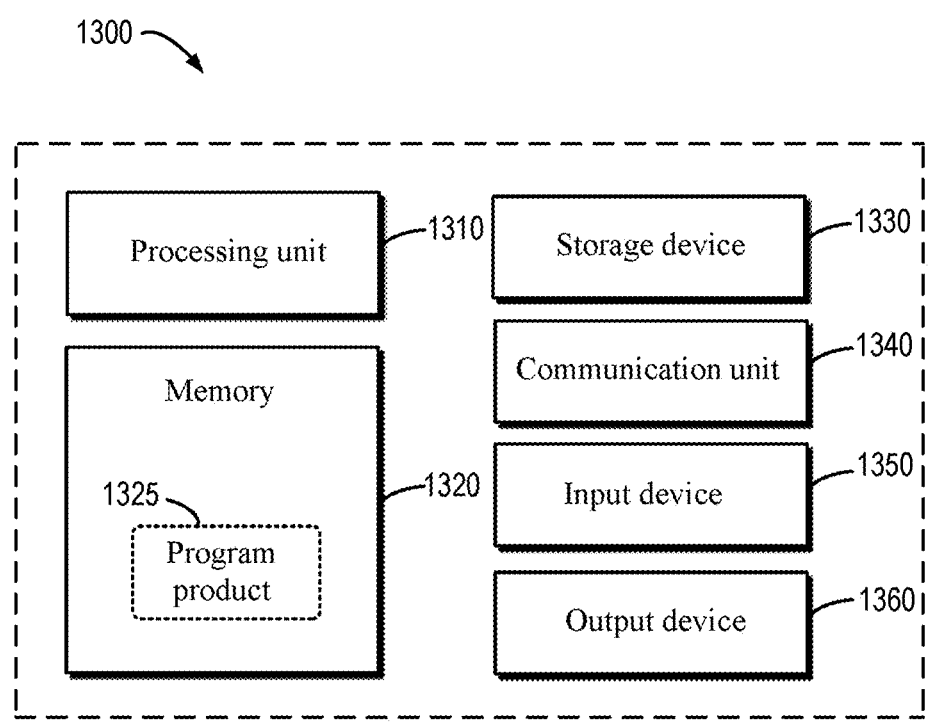
FIG. 13 illustrates a block diagram of a device that is capable of implementing multiple embodiments of the present disclosure.

FIG. 13 illustrates a block diagram of a computing device 1300 in which one or more embodiments of the present disclosure may be implemented. It should be understood that the computing device 1300 shown in FIG. 13 is merely exemplary and should not constitute any limitation on the functions and scopes of the embodiments described herein. The computing device 1300 shown in FIG. 13 can be used for implementing the terminal device 110 shown in FIG. 1.

As shown in FIG. 13, the computing device 1300 is in the form of a general-purpose computing device. Components of the computing device 1300 may include, but are not limited to, one or more processors or processing units 1310, a memory 1320, a storage device 1330, one or more communication units 1340, one or more input devices 1350, and one or more output devices 1360. The processing unit 1310 may be an actual or virtual processor and be capable of performing various processing according to programs stored in the memory 1320. In a multi-processor system, multiple processing units execute computer-executable instructions in parallel, so as to improve the parallel processing capability of the computing device 1300.

The computing device 1300 typically includes multiple computer storage media. Such media may be any available media accessible by the computing device 1300, including, but are not limited to, volatile and non-volatile media, removable and non-removable media. The memory 1320 may be a volatile memory (e.g., a register, a cache, a random access memory (RAM)), a non-volatile memory (e.g., a read only memory (ROM), an electrically erasable programmable read only memory (EEPROM), a flash memory) or some combination thereof. The storage device 1330 may be a removable or non-removable medium, and may include machine-readable media, such as flash drives, magnetic disks, or any other media, which may be used for storing information and/or data (e.g., training data for training), and is accessible within the computing device 1300.

The computing device 1300 may further include additional removable/non-removable, volatile/non-volatile storage media. Although not shown in FIG. 13, it is possible to provide magnetic disk drives for performing the reading or writing from removable and non-volatile magnetic disks (e.g., "floppy disks"), and optical disk drives for performing the reading or writing from removable and non-volatile optical disks. In these cases, each drive may be connected to a bus (not shown) by one or more data media interfaces. The memory 1320 may include a computer program product 1325, which has one or more program modules, and these program modules are configured to perform various methods or actions of various embodiments of the present disclosure.

The communication unit 1340 performs communication with other computing devices through a communication medium. Additionally, the functions of the components of the computing device 1300 may be implemented by a single computing cluster or multiple computing machines, and these computing machines are capable of performing communication through a communication connection. Accordingly, the computing device 1300 may perform an operation in a networked environment by using logical connections to one or more other servers, a network personal computer (PC), or another network node.

The input device 1350 may be one or more input devices, such as a mouse, a keyboard and a trackball. The output device 1360 may be one or more output devices, such as a display, a loudspeaker and a printer. The computing device 1300 may also communicate with one or more external devices (not shown), such as storage devices and display devices, through the communication unit 1340 as needed, or communicate with one or more devices that enable the user to interact with the computing device 130, or communicate with any device (e.g., a network card, a modem and the like), which enables the computing device 130 to communicate with the one or more other computing devices. Such communication may be executed by an input/output (I/O) interface (not shown).

According to an exemplary embodiment of the present disclosure, a computer-readable storage medium is provided, having computer-executable instructions stored thereon, wherein the computer-executable instructions are executed by a processor to implement the method described above. According to an exemplary embodiment of the present disclosure, a computer program product is further provided. The computer program product is tangibly stored on a non-transitory computer-readable medium and includes computer-executable instructions, and the computer-executable instructions are executed by a processor to implement the method described above.

Various aspects of the present disclosure have been described with reference to flow diagrams and/or block diagrams of the method, the apparatus, the device and the computer program product implemented according to the present disclosure. It should be understood that, computer-readable program instructions can implement each block in the flow diagrams and/or the block diagrams and combinations of the blocks in the flow diagrams and/or the block diagrams.

These computer-readable program instructions may be provided for a general-purpose computer, a special-purpose computer, or processing units of other programmable data processing apparatus to generate a machine, such that when executed by the computers or the processing units of the other programmable data processing apparatus, these instructions generate apparatuses that are used for implementing specified functions/actions in one or more blocks in the flow diagrams and/or the block diagrams. These computer-readable program instructions may also be stored in a computer-readable storage memory, and these instructions make the computers, the programmable data processing apparatuses and/or other devices work in particular manners, such that the computer-readable storage memory storing the instructions includes a product, which includes instructions for implementing various aspects of the specified functions/actions in one or more blocks in the flow diagrams and/or the block diagrams.

These computer-readable program instructions may be loaded on the computers, the other programmable data processing apparatuses or the other devices, so as to perform a series of operation steps on the computers, the other programmable data processing apparatuses or the other devices to produce processes that are implemented by the computers, such that the instructions executed on the computers, the other programmable data processing apparatuses or the other devices implement the specified functions/actions in one or more blocks in the flow diagrams and/or the block diagrams.

The flow diagrams and block diagrams in the drawings illustrate the architectures, functions and operations of possible implementations of systems, methods and computer program products according to multiple implementations of the present disclosure. In this regard, each block in the flow diagrams and block diagrams may represent a module, and a part of program segments or instructions, and the module, and the part of program segments or instructions contains one or more executable instructions for implementing specified logical functions. In some alternative implementations, the functions labeled in the blocks may occur out of the order labeled in the drawings. For example, two successive blocks may, in fact, be performed substantially in parallel, and can sometimes be performed in a reverse order, depending on the functions involved. It should also be noted that, each block in the block diagrams and/or flow diagrams, and combinations of the blocks in the block diagrams and/or flow diagrams may also be implemented by a dedicated hardware-based system, which is used for performing the specified functions or actions, or may be implemented by a combination of dedicated hardware and computer instructions.

Various implementations of the present disclosure have been described above, the foregoing description is exemplary, not exhaustive, and is not limited to the various disclosed implementations. Numerous modifications and variations will be apparent to those of ordinary skill in the art without departing from the scope and spirit of the described implementations. The terms used herein are chosen to best explain the principles of the various implementations, the practical applications or improvements over the technology on the market, or to enable others of ordinary skill in the art to understand the various implementations disclosed herein.

What is claimed is:

1. A method for user guidance of a creation mode, comprising:
acquiring creation guidance information for a user based on at least one of data indicating historical usage of the user on an application or profile information associated with the user, the creation guidance information configured to guide the user to use a creation function in the application, and the creation function configured to create first multimedia content;

presenting, in a current page of the application, second multimedia content created in a creation mode and a visual representation corresponding to the creation guidance information, the visual representation comprising a creation user interface element having a style that corresponds to the creation guidance information and illustrates the creation function, and the creation user interface element configured to enable the application to enter the creation mode for initiating a creation of the first multimedia content; and presenting a creation page associated with the creation function based on interaction associated with the visual representation.

2. The method according to claim 1, wherein the creation function comprises at least one of the following: a photographing function for photographing the first multimedia content and an uploading function for uploading the photographed first multimedia content.

3. The method according to claim 1, wherein presenting the visual representation corresponding to the creation guidance information comprises:

in response to determining that the current page is a start page of the application, presenting, in the start page, the creation user interface element for activating the creation function; and wherein presenting the creation page comprises:
in response to determining that the creation user interface element is selected in the start page, switching from the start page to the creation page.

4. The method according to claim 1, wherein presenting the visual representation corresponding to the creation guidance information comprises:

in response to determining that the current page is a playing page for playing the second multimedia content, presenting, in a playing area of the second multimedia content, the creation user interface element for activating the creation function and a browsing user interface element for entering a browsing function; and wherein presenting the creation page comprises:
in response to determining that the creation user interface element is selected in the playing page, switching from the playing page to the creation page.

5. The method according to claim 4, further comprising performing at least one of the following:

in response to determining that the browsing user interface element is selected in the playing page, stopping presenting the creation user interface element and the browsing user interface element in the playing page; and in response to determining that the playing page is switched from a first page tag to a second page tag while the creation user interface element and the browsing user interface element are presented, maintaining the presentation of the creation user interface element and the browsing user interface element while playing third multimedia content corresponding to the second page tag.

6. The method according to claim 1, wherein presenting the visual representation corresponding to the creation guidance information comprises:

adding a superimposed layer in the current page, the superimposed layer being placed on a top layer of the current page; and presenting, in the superimposed layer, the visual representation corresponding to the creation guidance information.

7. The method according to claim 1, wherein the creation function comprises a photographing function, the creation guidance information indicates the recommended photographing mode of the photographing function; and wherein presenting the creation page comprises:
in response to the creation user interface element being selected, switching from the current page to a creation page associated with activating the photographing function in the recommended photographing mode.

8. The method according to claim 1, wherein the creation guidance information indicates a recommended editing mode for editing the first multimedia content, and presenting the visual representation corresponding to the creation guidance information comprises:

determining whether the current page presents second multimedia content edited in the recommended editing mode; and in response to determining that it is determined that the current page presents the edited second multimedia content, presenting, in the current page, the visual representation corresponding to the creation guidance information, so as to indicate the recommended editing mode.

9. The method according to claim 1, wherein the creation guidance information indicates a recommended editing mode for editing the first multimedia content, and presenting the visual representation corresponding to the creation guidance information comprises:

deforming the creation user interface element in the current page into a style corresponding to sample multimedia content edited in the recommended editing mode; and wherein presenting the creation page comprises:
in response to the creation user interface element being selected, switching from the current page to the creation page for activating the creation function; and presenting, in the creation page, first multimedia content automatically edited in the recommended editing mode.

10. The method according to claim 1, wherein the application further comprises a publishing function for publishing the second multimedia content, and presenting the visual representation corresponding to the creation guidance information comprises:

in response to determining that the user does not publish the second multimedia content in the application, presenting the visual representation corresponding to the creation guidance information, so as to indicate a location, in the current page, of a creation user interface element for activating the creation function.

11. The method according to claim 1, wherein the creation guidance information is related to at least one of:

the preference of the user to a creation mode of the creation function, a preference of the user to an editing function for editing the first multimedia content, or an intention of the user to publish the first multimedia content in the application.

12. The method according to claim 1, further comprising:
in response to determining that the application is switched to an active state and the current page is a playing page for presenting second multimedia content with a target volume, presenting the second multimedia content on the basis of a predetermined volume, the predetermined volume being less than the target volume.

13. The method according to claim 12, wherein presenting the second multimedia content comprises:
   presenting the second multimedia content at the predetermined volume for a predetermined time period; and
   in response to determining that the predetermined time period expires, presenting the second multimedia content at the target volume.

14. The method according to claim 12, wherein presenting the second multimedia content comprises:
   gradually increasing a playing volume of the second multimedia content from the predetermined volume while the second multimedia content is presented, until reaching the target volume.

15. An electronic device, comprising:
   at least one processor; and
   at least one memory, coupled to the at least one processor and storing instructions executed by the at least one processor, and the at least one processor is configured to:
   acquire creation guidance information for a user based on at least one of data indicating historical usage of the user on an application or profile information associated with the user, the creation guidance information configured to guide the user to use a creation function in the application, and the creation function configured to create first multimedia content;
   present, in a current page of the application, second multimedia content created in a creation mode and a visual representation corresponding to the creation guidance information, the visual representation comprising a creation user interface element having a style that corresponds to the creation guidance information and illustrates the creation function, the creation user interface element configured to enable the application to enter the creation mode for initiating a creation of the first multimedia content; and
   presenting a creation page associated with the creation function based on interaction associated with the visual representation.

16. The electronic device according to claim 15, wherein the creation function comprises at least one of the following: a photographing function for photographing the first multimedia content and an uploading function for uploading the photographed first multimedia content.

17. The electronic device according to claim 15, wherein the at least one processor is configured to present the visual representation corresponding to the creation guidance information in the following manner:
   in response to determining that the current page is a start page of the application, presenting, in the start page, the creation user interface element for activating the creation function; and
   wherein the at least one processor is configured to present the creation page in the following manner:
      in response to determining that the creation user interface element is selected in the start page, switching from the start page to the creation page.

18. The electronic device according to claim 15, wherein the at least one processor is configured to present the visual representation corresponding to the creation guidance information in the following manner:
   in response to determining that the current page is a playing page for playing the second multimedia content, presenting, in a playing area of the second multimedia content, the creation user interface element for activating the creation function and a browsing user interface element for entering a browsing function; and
   wherein the at least one processor is configured to present the creation page in the following manner:
      in response to determining that the creation user interface element is selected in the playing page, switching from the playing page to the creation page.

19. The electronic device according to claim 18, wherein the at least one processor is configured to perform at least one of the following:
   in response to determining that the browsing user interface element is selected in the playing page, stopping presenting the creation user interface element and the browsing user interface element in the playing page; and
   in response to determining that the playing page is switched from a first page tag to a second page tag while the creation user interface element and the browsing user interface element are presented, maintaining the presentation of the creation user interface element and the browsing user interface element while playing third multimedia content corresponding to the second page tag.

20. A non-transitory computer-readable storage medium storing thereon a computer program that, when executed by a processor, implements:
   acquiring creation guidance information for a user based on at least one of data indicating historical usage of the user on an application or profile information associated with the user, the creation guidance information configured to guide the user to use a creation function in the application, and the creation function configured to create multimedia content;
   presenting, in a current page of the application, second multimedia content created in a creation mode and a visual representation corresponding to the creation guidance information, the visual representation comprising a creation user interface element having a style that corresponds to the creation guidance information and illustrates the creation function, the creation user interface element configured to enable the application to enter the creation mode for initiating a creation of the first multimedia content; and
   presenting a creation page associated with the creation function based on interaction associated with the visual representation.

\* \* \* \* \*